(12) United States Patent
Melton et al.

(10) Patent No.: US 11,231,377 B2
(45) Date of Patent: Jan. 25, 2022

(54) HAZARDOUS ENVIRONMENT INSPECTION SYSTEM AND RELATED APPARATUS AND METHODS

(71) Applicant: Northrop Grumman Systems Corporation, Falls Church, VA (US)

(72) Inventors: Jonathan G. Melton, Ogden, UT (US); Mark R. Eggett, Brigham City, UT (US)

(73) Assignee: Northrop Grumman System Corporation, Falls Church, VA (US)

(*) Notice: Subject to any disclaimer, the term of this patent is extended or adjusted under 35 U.S.C. 154(b) by 0 days.

(21) Appl. No.: 16/893,830

(22) Filed: Jun. 5, 2020

(65) Prior Publication Data

US 2020/0393387 A1 Dec. 17, 2020

Related U.S. Application Data

(60) Provisional application No. 62/861,835, filed on Jun. 14, 2019.

(51) Int. Cl.
*G01N 21/954* (2006.01)
*G01N 21/88* (2006.01)
*H04N 5/232* (2006.01)
*H04N 5/225* (2006.01)

(52) U.S. Cl.
CPC ....... *G01N 21/954* (2013.01); *G01N 21/8806* (2013.01); *H04N 5/2253* (2013.01); *H04N 5/2256* (2013.01); *H04N 5/23203* (2013.01); *H04N 5/23299* (2018.08); *G01N 2201/062* (2013.01); *H04N 2005/2255* (2013.01)

(58) Field of Classification Search
None
See application file for complete search history.

(56) References Cited

U.S. PATENT DOCUMENTS

| | | | |
|---|---|---|---|
| 5,195,392 A | 3/1993 | Moore et al. | |
| 7,236,342 B2 | 6/2007 | Vazach et al. | |
| 8,766,794 B2 | 7/2014 | Ferguson et al. | |
| 9,201,414 B2 | 12/2015 | Kantzes et al. | |
| 9,866,803 B2 | 1/2018 | Pool | |
| 10,674,080 B2* | 6/2020 | Palmer | H04N 5/247 |
| 10,864,640 B1* | 12/2020 | Innes | B25J 11/0085 |
| 2015/0339948 A1 | 11/2015 | Wood et al. | |
| 2017/0019641 A1* | 1/2017 | Rahms | E21D 23/12 |
| 2017/0322421 A1 | 11/2017 | Hunter et al. | |
| 2018/0146174 A1* | 5/2018 | Pool | H04N 5/2256 |

FOREIGN PATENT DOCUMENTS

WO 91/18236 A2 11/1991

* cited by examiner

*Primary Examiner* — James M Anderson, II
(74) *Attorney, Agent, or Firm* — TraskBritt

(57) ABSTRACT

An inspection device for inspecting explosive environments. The inspection device may include a camera and an intrinsic safety barrier. The intrinsic safety barrier may be configured to receive camera power and control signals and transmit intrinsically safe camera power and control signals to the camera.

20 Claims, 9 Drawing Sheets

HAZARDOUS ENVIRONMENT INSPECTION SYSTEM AND RELATED APPARATUS AND METHODS

CROSS-REFERENCE TO RELATED APPLICATION

This application claims the benefit under 35 U.S.C. § 119(e) of U.S. Provisional Patent Application Ser. No. 62/861,835, filed Jun. 14, 2019, the disclosure of which is hereby incorporated herein in its entirety by this reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. FA8214-16-C-0001 awarded by the United States Department of the Air Force.

TECHNICAL FIELD

Embodiments of the present disclosure generally relate to inspection systems. In particular, to inspection system, apparatus and methods configured to perform non-destructive inspections in hazardous environments.

BACKGROUND

Cameras may be used for inspecting hazardous environments. For instance, a video inspection system can provide a more detailed inspection than the naked eye, can be exposed to environments incompatible with human life, and can often identify defects long before they become apparent to less sophisticated inspection systems. These defects, if left unnoticed, can result in significant safety hazards, and in some environments, can lead to catastrophe. Some examples of hazardous environments include tanks used for the transport and storage of hazardous material, such as fuel tanks, oil tanks, or other dangerous chemicals; pipelines used in the transportation of hazardous material such as oil and gas; and rocket motors and attached casings that store and/or provide rocket fuel, rocket fuel components, etc. to the rocket motor.

Hazardous environments that contain volatile gasses, vapors, liquids or other materials are typically classified by zones. Specifically, a Zone 2 environment has no risk of fire or explosion, Zone 1 has a higher risk of fire or explosion, and Zone 0 has a high risk of fire or explosion. Equipment is typically certified to operate in specific zones. For instance, one device may be certified only for use in Zone 2 environments, while another device may be certified for use in Zone 1. Typically, devices certified for Zone 1 can also be used in Zone 2 since Zone 2 has less stringent requirements for safety than Zone 1. In order to satisfy the requirements for Zone 1 and Zone 0, certain electrical and mechanical design requirements must be met. These design requirements are primarily focused on safety concerns, and include the limitations to avoid excessive heat, fire, spark, static, or other sources of ignition of materials in the environment to which the device is exposed. Devices that are designed for use within the Zone 1 and Zone 0 environments are considered "intrinsically safe."

BRIEF SUMMARY

Some embodiments may include an inspection apparatus for inspecting a rocket bore. The inspection apparatus may include a camera, an illuminating device, and an intrinsic barrier. The camera may be configured to be used in a rocket bore. The camera may be configured to receive camera power and camera control signals from an area outside the rocket bore. The illuminating device may be adjacent to the camera. The illuminating device may be configured to receive illumination power and illumination control signals from an area outside the rocket bore. The intrinsic barrier may be configured to receive the camera power, the camera control signals, the illumination power, and the illumination control signals in the area outside the rocket bore. The intrinsic barrier may be configured to pass the camera power, the camera control signals, the illumination power, and the illumination control signals to the camera and the illuminating device into the rocket bore in an intrinsically safe manner.

Another embodiment may include an inspection system for explosive environments. The inspection system may include an inspection head and an intrinsic barrier. The inspection head may include a camera and an illumination device. The inspection head may be configured to be secured within an explosive environment. The intrinsic barrier may be configured to receive electrical signals and power for the inspection head in an area outside the explosive environment. The intrinsic barrier may also be configured to transmit intrinsically safe electrical signals and intrinsically safe power to the inspection head.

A further embodiment may include a method of performing inspections in hazardous environments. The method may include mounting an inspection head inside a hazardous environment, the inspection head comprising an externally powered camera and an illumination device. The method may also include transmitting power to the inspection head through an intrinsic barrier. The method may further include transmitting electrical control signals to the inspection head through the intrinsic barrier. The method may also include receiving imaging data from the inspection head.

BRIEF DESCRIPTION OF THE DRAWINGS

While the specification concludes with claims particularly pointing out and distinctly claiming embodiments of the present disclosure, the advantages of embodiments of the disclosure may be more readily ascertained from the following description of embodiments of the disclosure when read in conjunction with the accompanying drawings in which:

DETAILED DESCRIPTION

The illustrations presented herein are not meant to be actual views of any particular inspection system or component thereof, but are merely idealized representations employed to describe illustrative embodiments. The drawings are not necessarily to scale.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the term "substantially" or "about" in reference to a given parameter means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, at least about 99% met, or even 100% met.

Cameras may be used to inspect hazardous areas, such as areas having an explosive atmosphere. For example, cameras may be used to inspect fuel tanks, rocket motors, oil and gas pipelines, etc. When cameras are used to inspect areas having an explosive atmosphere such as Zone 1 and/or Zone 0 environments, steps must be taken to make the camera intrinsically safe. For example, the camera may be placed in an explosion proof housing before being inserted into the hazardous area. In another embodiment, the camera may be a low power battery powered camera wherein the internal electrical components are low power components that are considered intrinsically safe.

Intrinsic safety standards may be set by a standards setting agency, such as the National Fire Protection Association (NFPA), International Electrotechnical Commission (IEC), Canadian Standards Association (CSA), etc. Such standards may be published, such as in the National Electric Code (NEC), the IEC International Standards (IS), the Canadian Electric Code (CEC), etc.

Some hazardous areas may have a limited amount of space. Explosion proof housings and battery operated cameras may be relatively large and difficult to manipulate once inserted in a hazardous area with limited space. For example, rocket motors may have a small amount of space within a bore defined within the rocket motor.

Figure 1:
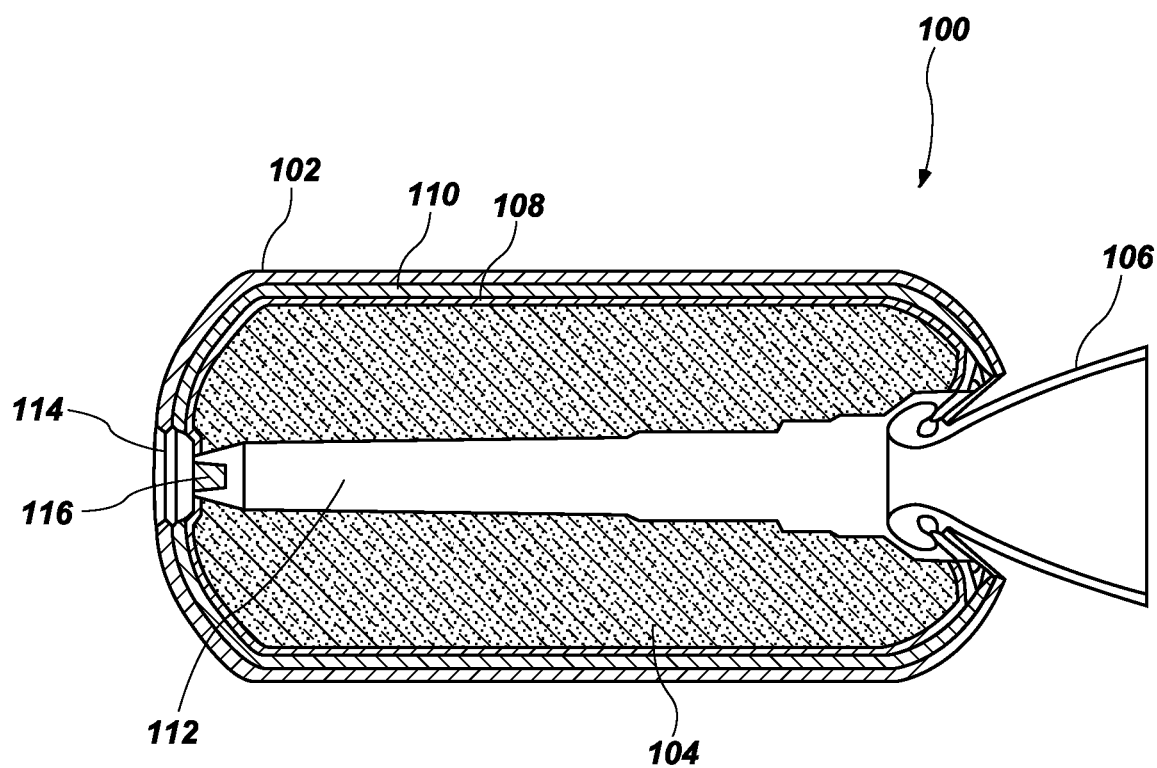
FIG. 1 illustrates a cross sectional view of a rocket motor according to an embodiment of the present disclosure.

FIG. 1 is a simplified cross-sectional view of a rocket motor 100 (e.g., a solid rocket motor), in accordance with embodiments of the disclosure. The rocket motor 100 may, for example, be configured to be a component (e.g., stage) of a larger assembly (e.g., a multi-stage rocket motor assembly). As shown in FIG. 1, the rocket motor 100 includes a casing 102, a propellant structure 104 disposed within the casing 102, and a nozzle assembly 106 connected to an aft end of the casing 102. The rocket motor 100 may also include one or more of a liner structure 108 and an insulation structure 110 between the propellant structure 104 and the casing 102. For example, the liner structure 108 may be located on or over the propellant structure 104, and the insulation structure 110 may be located on and between the liner structure 108 and an inner surface of the casing 102. The propellant structure 104 may define a bore 112 extending between a port 114 on a fore end of the casing 102 and the nozzle 106 on the aft end of the casing.

The port 114 may provide an insertion point for a component 116, such as an igniter or an inspection device. The component 116 may be secured to the port 114 through a mechanical connection, such as complementary threads (e.g., machine threads, pipe threads (NPT), tapered threads, straight threads, etc.), a coupler (e.g., flange coupler, cam lock coupler, etc.), hardware (e.g., pins, screws, bolts, rivets, etc.), or a combination thereof.

Figure 2:
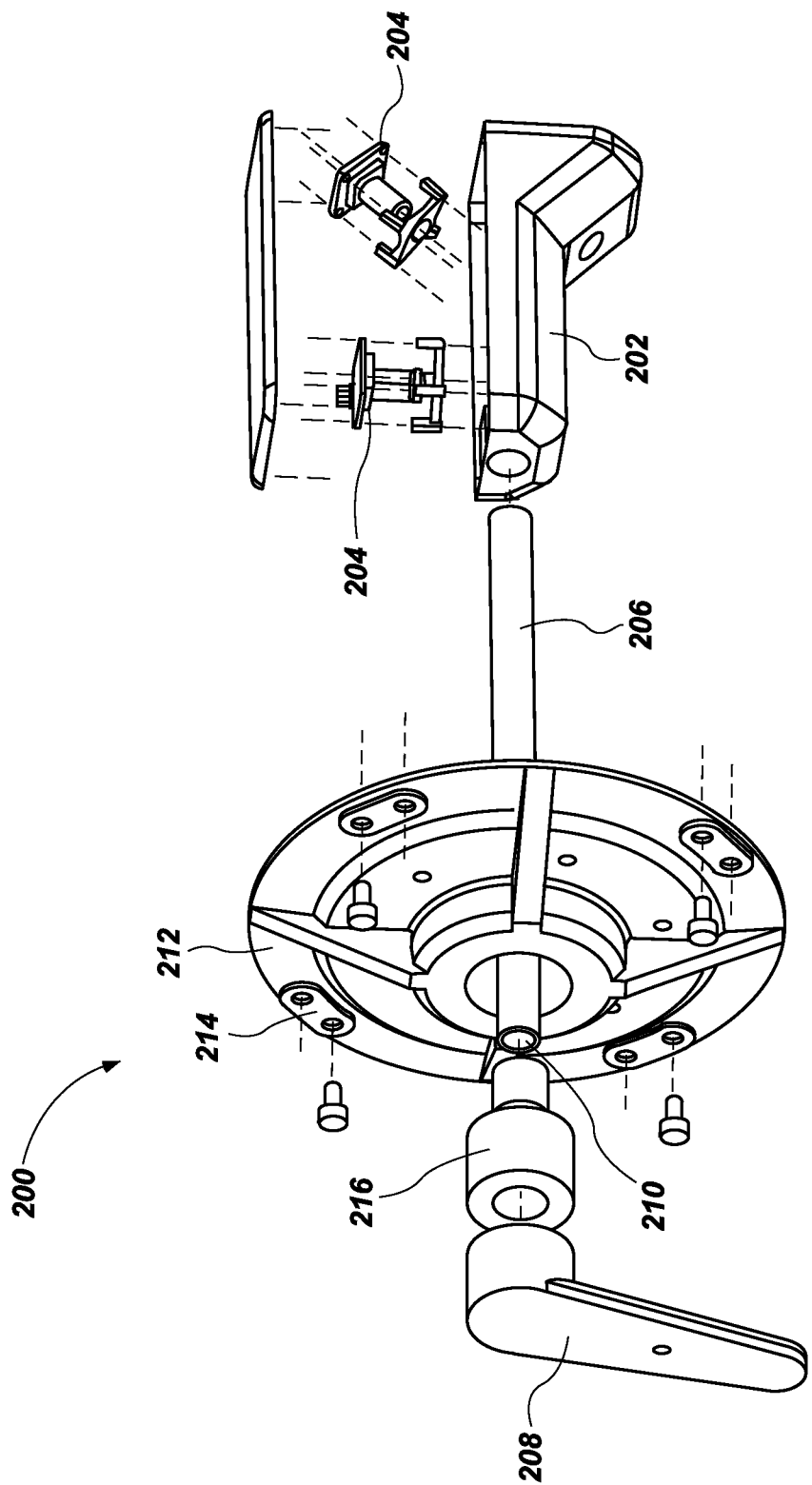
FIG. 2 illustrates an exploded view of an inspection device according to an embodiment of the present disclosure.

FIG. 2 is an exploded view of an inspection device 200. The inspection device 200 may include an inspection head 202. The inspection head 202 may include one or more cameras 204. The cameras 204 may be configured to capture images of an inside portion of an item being inspected. As shown in FIG. 2, the inspection head 202 may include multiple cameras 204 arranged at different angles. The multiple cameras 204 may be arranged to capture images of different portions of the inside portion of the item being inspected substantially simultaneously.

The inspection head 202 may be coupled to a non-hazardous area (e.g., an exterior portion of the item being inspected) through a shaft 206. In some embodiments, the inspection head 202 may communicate with external components through the shaft 206. For example, a handle 208 may mechanically communicate with the inspection head 202 through the shaft 206. The shaft 206 may be rotationally secured to both the handle 208 and the inspection head 202 such that rotation of the handle 208 translates to the inspection head 202 through the shaft 206 thereby rotating the inspection head 202. The shaft 206 may be rotationally secured through a mechanical connection (e.g., set screw, key stock, groove, interference fit, etc.), an adhesive (e.g., epoxy, glue, etc.), solder, a weld, or a combination thereof. In some embodiments, the shaft 206 may be hollow. A connection such as a wire, a cable, fiber optics, etc. may pass through a passage 210 defined within the hollow shaft 206. The connection may, for example, provide power to the inspection head 202 and/or relay signals to and/or from the inspection head 202.

The inspection device 200 may include a mounting plate 212 configured to secure the inspection device 200 near the area being inspected. For example, the mounting plate 212 may be configured to mount the inspection device 200 to the exterior portion of the item being inspected. The mounting plate 212 may include mounting structures 214 configured to receive mounting hardware (e.g., pins, screws, bolts, nuts, rivets, etc.) and/or interface with other mounting components such as threads or couplers. The mounting plate 212 may include a sealing element 216 configured to substantially seal an area around the shaft 206 while allowing the shaft 206 to rotate relative to the mounting plate 212. In some embodiments, the sealing element 216 may include a bushing, a bearing and seat, a rubber seal, packing material, etc.

Figure 3:
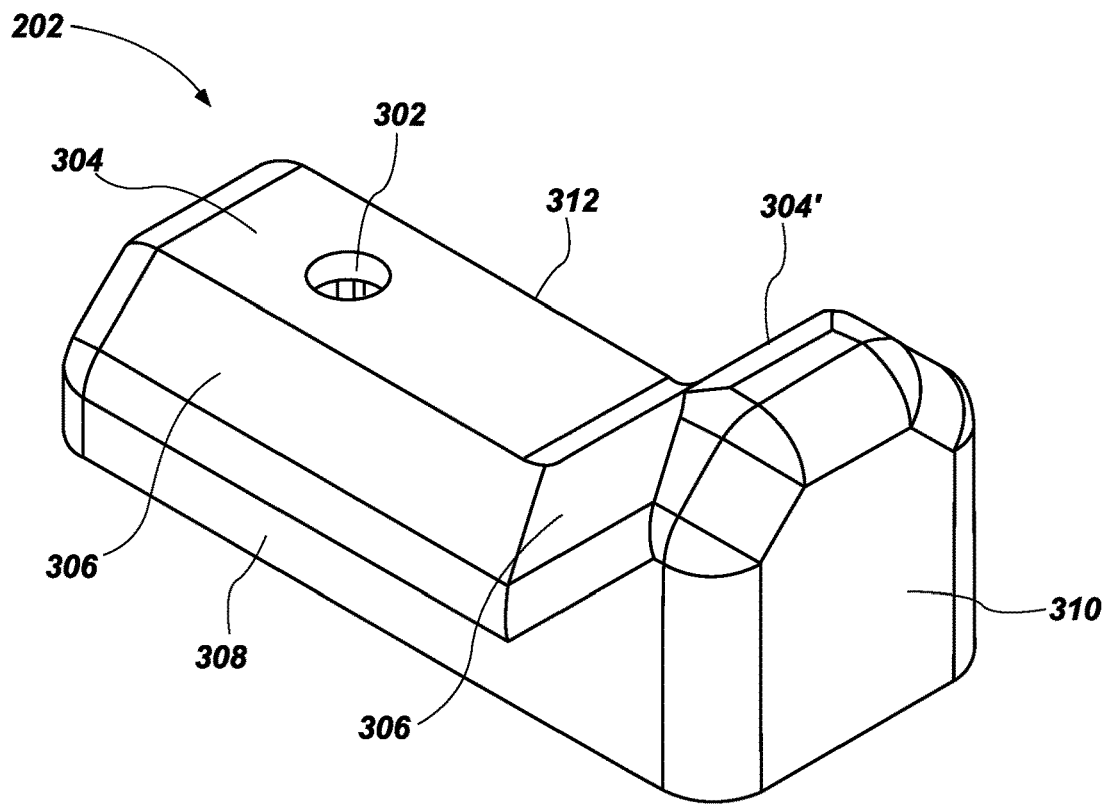
FIG. 3 illustrates an isometric view of an inspection head of the inspection device of FIG. 2 according to an embodiment of the present disclosure.

FIG. 3 is an illustration of the inspection head 202. The inspection head 202 may include one or more openings 302 through which the cameras 204 may capture images. One or more openings 302 may be defined in a substantially flat surface 304 of the inspection head 202. The openings 302 may extend through the substantially flat surface 304 in a direction normal (e.g., perpendicular) to a plane of the substantially flat surface 304. The inspection head 202 may include chamfered surfaces 306 extending between the substantially flat surfaces 304 and side surfaces 308 of the inspection head 202. In some embodiments, the inspection head 202 may include additional openings in the chamfered surfaces 306 and/or the side surfaces 308. The additional openings may facilitate additional cameras 204 or other associated elements, such as lighting elements, sensors, emitters, receivers, etc.

The inspection head 202 may include an extended section 310. The extended section 310 may have a thickness that is greater than a thickness of a main body 312 of the inspection head 202. The substantially flat surface 304 may abut against a second flat surface 304' that may extend at an angle from the substantially flat surface 304 of the main body 312 to the extended section 310. The second flat surface 304' may include an opening (shown in FIG. 5) through which a second camera 204 may capture images in a direction normal to a plane of the second flat surface 304'.

Figure 4:
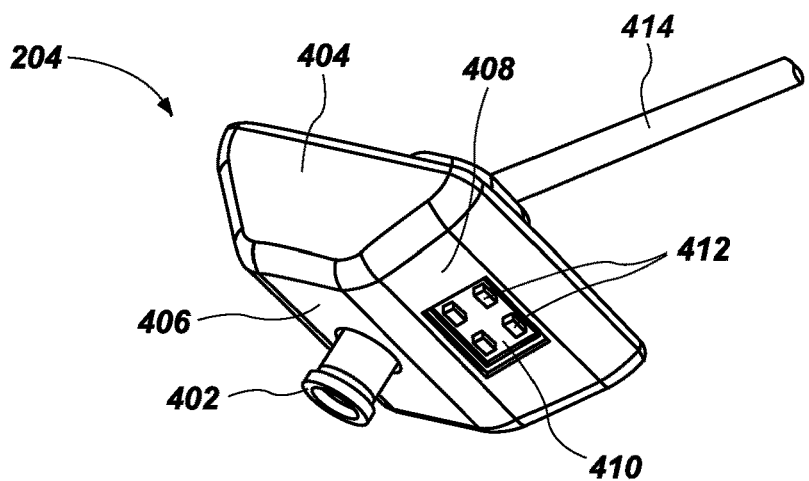
FIG. 4 illustrates an isometric view of a camera according to an embodiment of the present disclosure.

FIG. 4 is an illustration of the camera 204 that may be inserted into the inspection head 202. The camera 204 may include a lens 402 extending from a body 404 of the camera 204. The body 404 may have a shape that is complementary to a shape of the inspection head 202. For example, the body 404 may include a flat surface 406 and chamfered surfaces 408 configured to fit inside a cavity defined within the inspection head 202 by the substantially flat surfaces 304, 304', the chamfered surfaces 306, and the side surfaces 308.

The camera 204 may include an illuminating device 410 configured to illuminate an area around the camera 204. In some embodiments, the illuminating device 410 may be configured to produce visible light. In some embodiments, the illuminating device 410 may be configured to produce light from non-visible spectrums, such as infrared light, ultraviolet light, etc. The illuminating device 410 may include one or more lights 412 that are configured to draw a relatively small amount of power. For example, the illuminating device 410 may include an array of lights 412 such as light emitting diodes (LEDs). In some embodiments, the interior surface of a tank, pipeline, or rocket motor enclosing the hazardous area may be substantially reflective (e.g., may reflect and not absorb substantially all light rays impinging on the surface). Light rays reflecting off the interior surface of the item being inspected may distort or obscure images captured by the camera 204. The illuminating device 410 may be positioned on the chamfered surface 408, such that rays of light emitted by the illuminating device 410 may impinge the interior surface of the item being inspected at an angle relative to the lens 402. The angled light rays may reduce and/or prevent image distortion and/or obstruction due to the reflected light rays.

The camera 204 may be configured to be powered externally. For example, the camera 204 may receive power through a cable 414 coupled to the camera 204. The cable 414 may provide power to the camera 204 from an external source (e.g., a source outside a hazardous area). In some embodiments, the cable 414 may also transport electrical signals between the camera 204 and external components.

In some embodiments, the camera 204 may be configured to transmit image data to an external device, such as a computer (e.g., server, personal computer (PC), laptop, tablet, phone, etc.), storage device (e.g., solid state memory, disk drive, recording device, hard drive, memory card, flash memory, etc.), display (e.g., monitor, screen, projector, etc.), or other data handling device. In some embodiments, the camera 204 may include an internal storage device (e.g., memory chip, memory card, flash memory, etc.) configured to store image data until the camera 204 or storage device is connected to another device to transfer and/or erase the image data.

Figure 5:
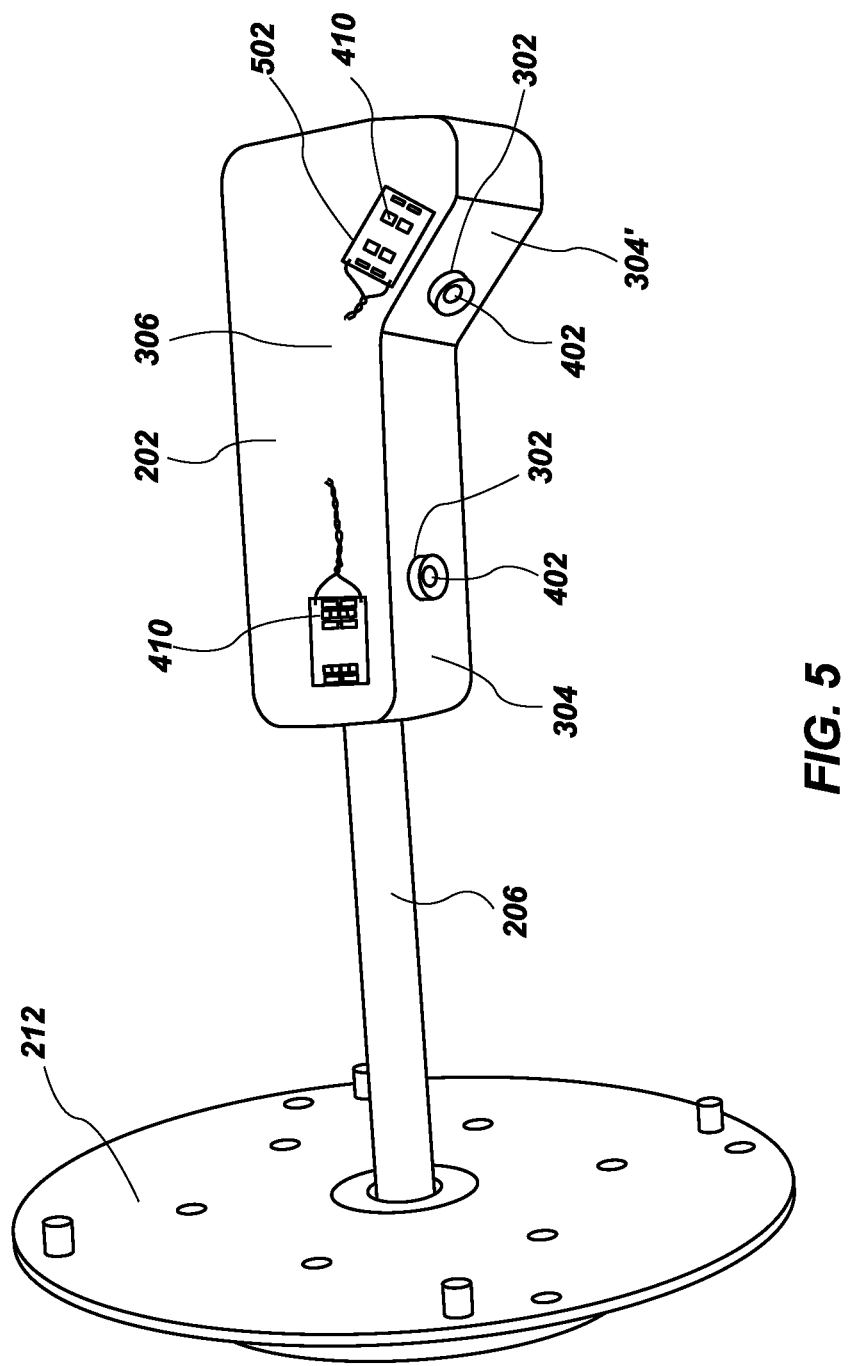
FIG. 5 illustrates an isometric view of the inspection device of FIG. 2.

FIG. 5 is an illustration of an assembled inspection head 202. The inspection head 202 may be coupled to the shaft 206 extending through the mounting plate 212. The inspection head 202 may include two cameras 204 enclosed within the inspection head 202. The lenses 402 of the cameras 204 may extend from the inspection head 202 through the openings 302 in the substantially flat surface 304 and the second flat surface 304'. The angle between the substantially flat surface 304 and the second flat surface 304' may position the cameras 204 such that the lenses 402 are directed in different directions. The different directions of the lenses 402 may enable the cameras 204 to capture images of different portions of the item being inspected.

The inspection head 202 may include additional openings 502 through which the illuminating devices 410 may illuminate an area around the inspection head 202. In some embodiments, the illuminating devices 410 may be positioned on the chamfered surface 306 of the inspection head 202 separate from the camera 204. For example, the illuminating devices 410 may be separately powered and/or controlled from the camera 204. The illuminating devices 410 may be surface mounted on the inspection head 202 instead of providing illumination through openings 502 in the inspection head 202.

In some embodiments, the inspection head 202 may be formed from materials that are not likely to produce a spark through contact with another material. For example, the inspection head 202 may be formed from polymeric materials (e.g., polytetrafluoroethylene (PTFE), Polyvinyl chloride (PVC), low-density polyethylene (LDPE), high-density polyethylene (HDPE), polystyrene, Polyoxymethylene (POM), polyurethane, silicone, etc.), composite materials (e.g., fiberglass, carbon fiber, etc.), non-ferrous metals (e.g., aluminum, copper, brass, silver, lead, etc.), or combinations thereof. In some embodiments, the inspection head 202 may be formed from insulating materials (e.g., electrically insulating and/or thermally insulating), such as polymeric materials, and/or composite materials.

Figure 6:
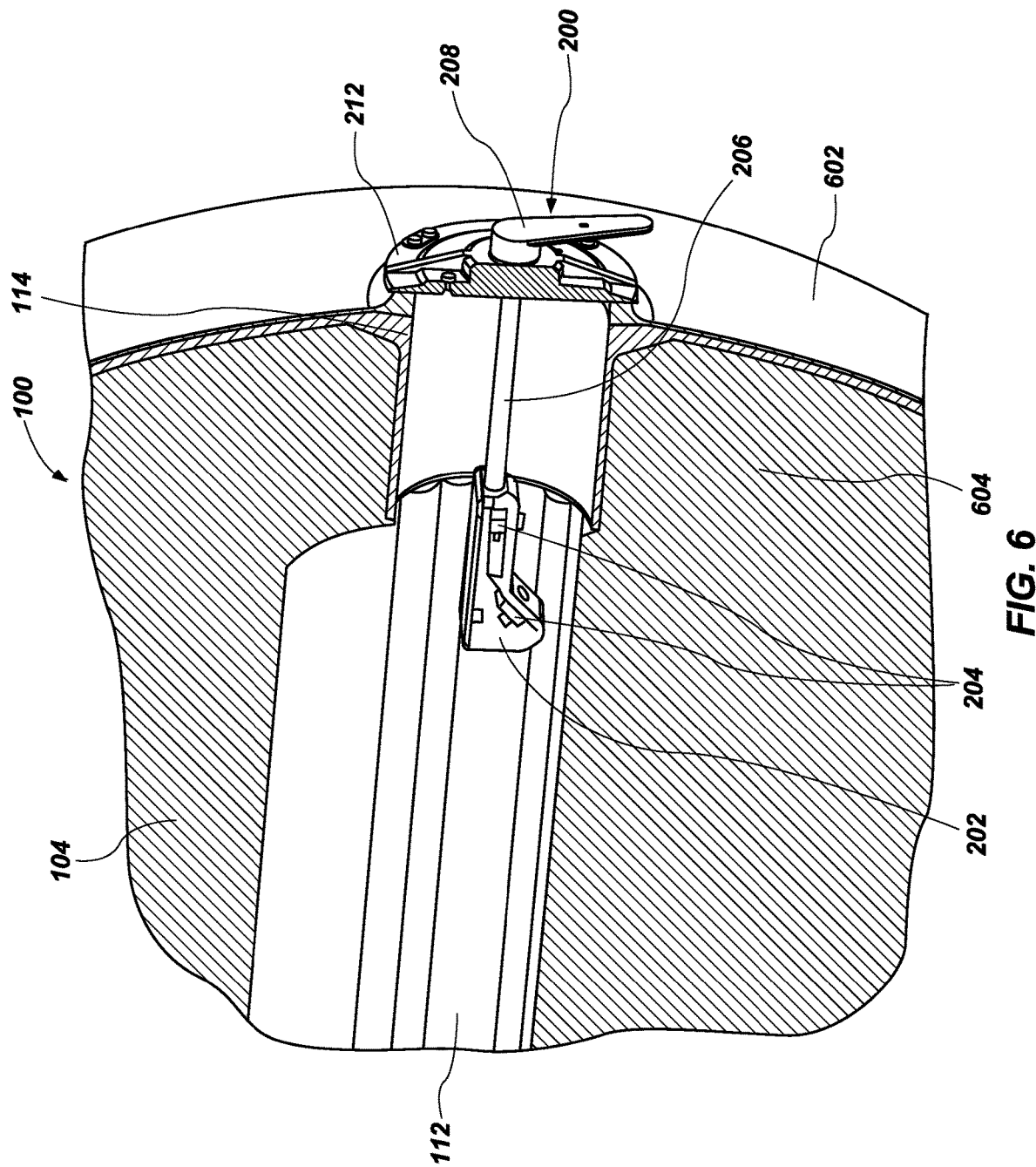
FIG. 6 illustrates an enlarged cross sectional view of a portion of a rocket motor having an inspection device according to an embodiment of the present disclosure installed thereon.

FIG. 6 illustrates a cross sectional view of the fore end of a rocket motor 100 with the inspection device 200 installed in the port 114. The inspection head 202 may be positioned within the bore 112 defined by the propellant structure 104. The inspection head 202 may be coupled to the handle 208 through the shaft 206. The shaft 206 may extend from an exterior portion 602 of the rocket motor 100 to an interior portion 604 of the rocket motor 100. The interior portion 604 of the rocket motor 100 may be a hazardous area. For example, the propellant structure 104 may include active rocket fuel, residual rocket fuel, and/or other potentially explosive materials. The inspection head 202 may be constructed from materials configured to substantially prevent the inspection head 202 from igniting any potentially explosive materials. As described above, the inspection head 202 may be formed from materials that are not likely to produce a spark and/or insulating materials. In some embodiments, any electronics in the inspection head 202 may be intrinsically protected by an intrinsic barrier located outside the rocket motor 100, discussed in further detail below with respect to FIGS. 8-10.

The inspection device 200 may be secured to the rocket motor 100 and/or the port 114 of the rocket motor 100 through the mounting plate 212. The mounting plate 212 may be secured to the exterior portion 602 of the rocket motor 100. In some embodiments, the port 114 and/or the exterior portion 602 of the rocket motor 100 may include interfacing hardware configured to interface with mounting hardware on the mounting plate 212. For example, the interfacing hardware may include threaded inserts, studs, protruding pins, threads, one or more flanges, protrusions, recesses, etc. The mounting plate 212 may include complementary hardware configured to interface with the interfacing hardware to secure the mounting plate 212 to the rocket motor 100.

The handle 208 may enable a user to rotate the inspection head 202 relative to the interior portion 604 of the rocket motor 100 from the non-hazardous environment outside the rocket motor 100. For example, the user may rotate the handle 208 relative to the mounting plate 212. The rotation of the handle 208 may be translated to the inspection head 202 through the shaft 206. The cameras 204 in the inspection head 202 may then capture images from different portions of the interior portion 604 of the rocket motor 100 based on a rotational position of the handle 208.

Figure 7:
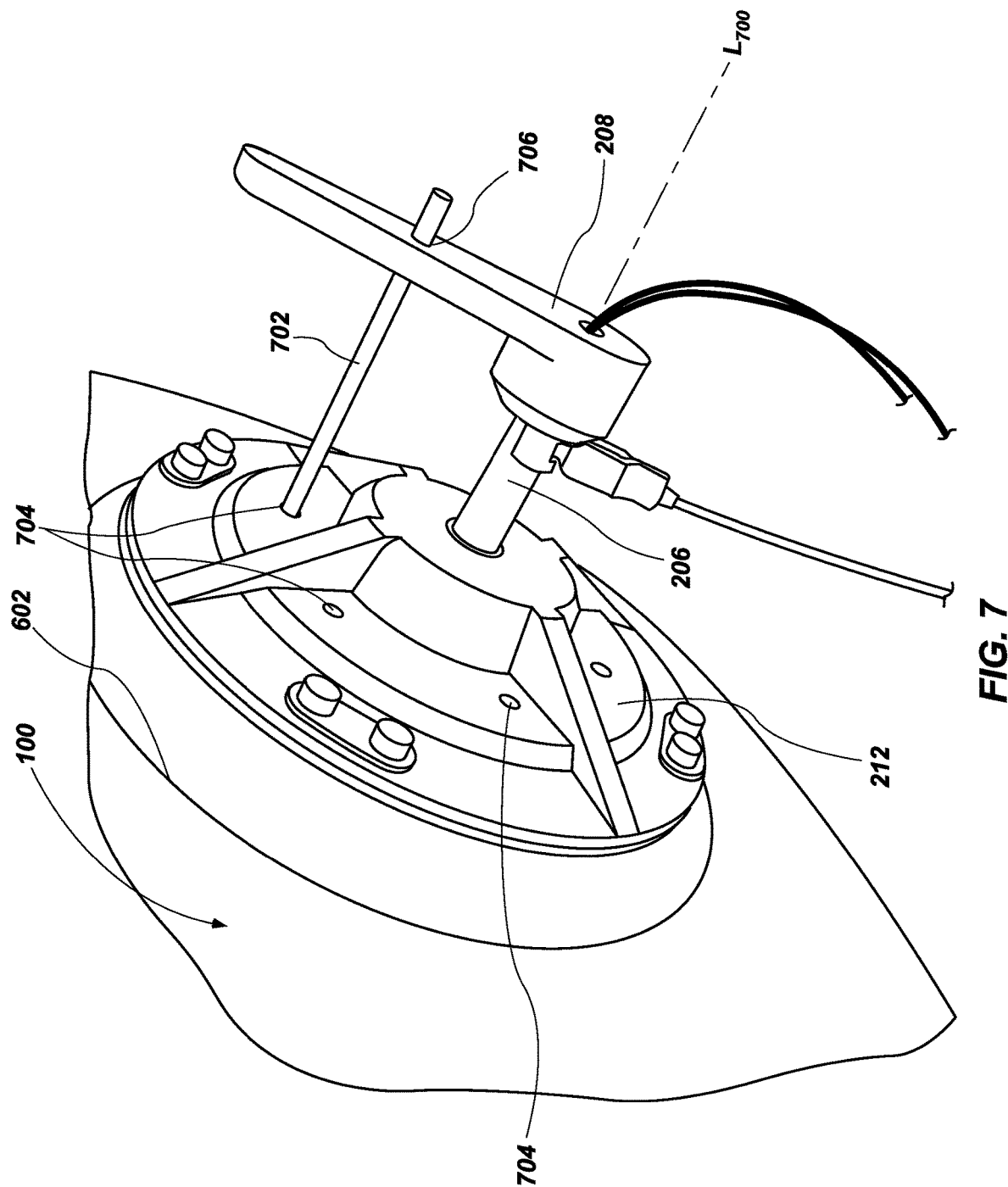
FIG. 7 illustrates an enlarged view of an exterior portion of the rocket motor having an inspection device installed as illustrated in FIG. 6.

FIG. 7 is an enlarged view of the handle 208 and mounting plate 212 of the inspection device 200 mounted to a rocket motor 100. The mounting plate 212 may be secured to the exterior portion 602 of the rocket motor 100. The handle 208 may be coupled to the shaft 206. The shaft 206 may pass through the mounting plate 212 to the inspection head 202 (FIG. 6) located in the interior portion 604 (FIG. 6) of the rocket motor 100.

The inspection device 200 may include an indexing feature configured to secure the handle 208 and/or inspection head 202 (FIG. 6) in different rotational positions. As illustrated in FIG. 6, the index positioning feature may include a pin 702, a series of indexed retainers 704, and a pin catch 706. The pin 702 may be configured to rotationally latch the handle 208 at different rotational positions defined by the series of indexed retainers 704. The series of indexed retainers 704 may be positioned in the mounting plate 212 at different rotational positions around the mounting plate 212. For example, the indexed retainers 704 may be positioned at equal angles of rotation about an axis L700 of rotation of the handle 208. In some embodiments, there may be between about 0 degrees and about 90 degrees between each of the indexed retainers, such as between about 10 degrees and about 60 degrees, or between about 30 degrees and about 60 degrees. In some embodiments, the series of indexed retainers 704 may be a series of holes. In some embodiments, the series of indexed retainers 704 may be a series of grooves or ridges extending radially from the axis L700 of rotation of the handle 208. The pin 702 may extend from the handle 208 to the mounting plate 212. The pin 702 may be configured to catch in the indexed retainers 704. The handle 208 may include a pin catch 706 configured to couple the handle 208 to the pin 702. In some embodiments, the pin catch 706 may be a hole through the handle substantially the same radial distance from the axis L700 of rotation of the handle 208 as the series of indexed retainers 704. The pin catch 706 may substantially prevent rotation of the handle 208 when the pin 702 is engaged by both the pin catch 706 and one or more of the indexed retainers 704. To rotate the handle 208, the user may release the pin 702 from the one or more indexed retainers 704 and/or the pin catch 706. The user may then re-engage the pin 702 with the pin catch 706 and at least one different indexing retainer 704 substantially locking the handle 208 in a different rotational position. In some embodiments, the pin 702 may include a biasing element, such as a spring configured to bias the pin 702 toward the indexed retainers 704. For example, the biasing element may be coupled between the pin 702 and the handle 208, such that the pin 702 may enter the indexed retainers 704 under the force of the biasing element when the pin 702 and the pin catch 706 are aligned with the indexed retainer 704. In some embodiments, the indexing feature may include other selective rotational locks, such as interlocking cogs, ratcheting teeth, etc.

Figure 8:
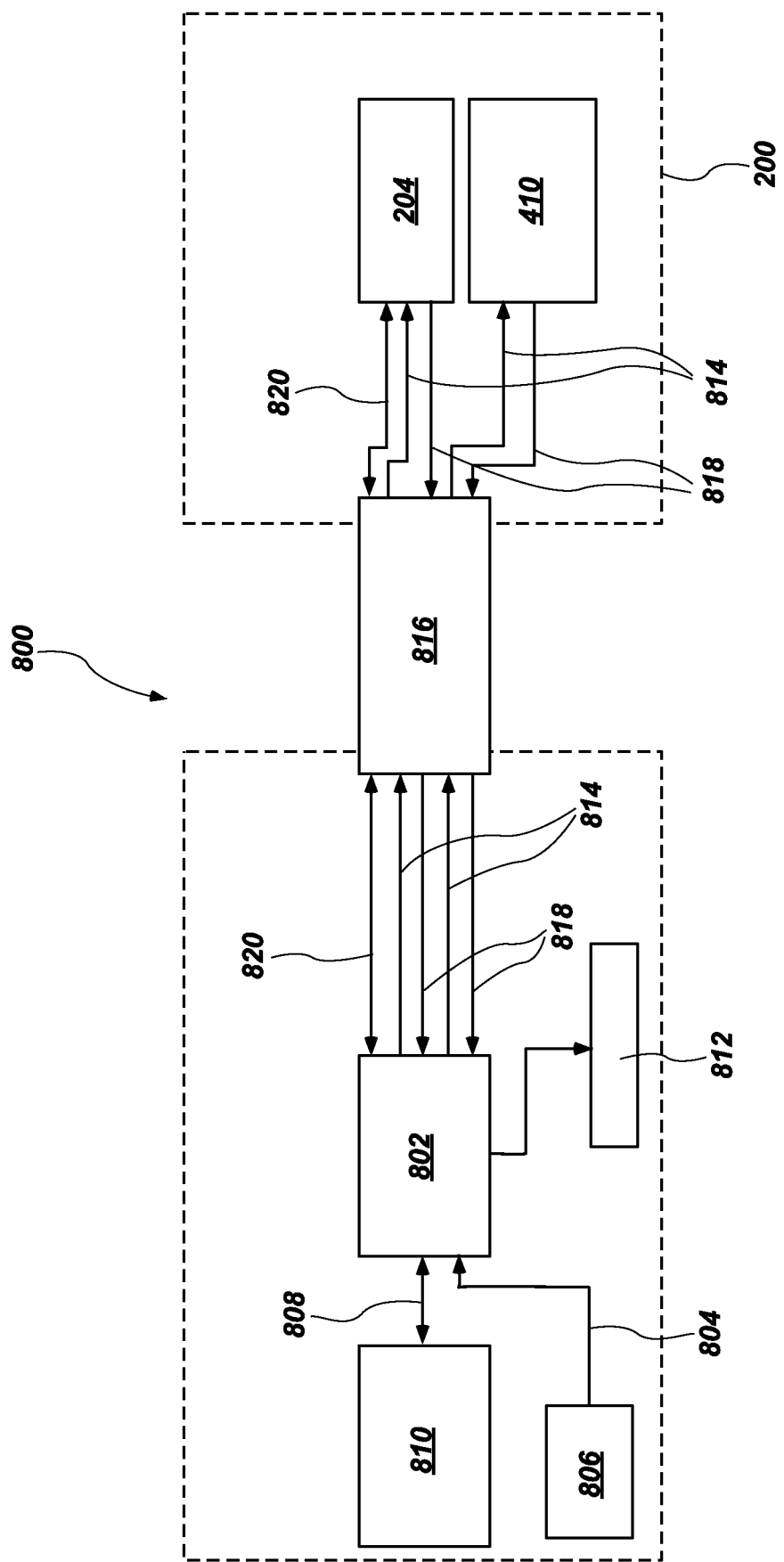
FIG. 8 illustrates a wiring schematic of an inspection system according to an embodiment of the present disclosure.

FIG. 8 illustrates a system wiring diagram 800 for the inspection device 200. The inspection device 200 may include electronic devices such as the camera 204 and the illuminating devices 410. All electronic signals and/or power for the electronic devices in the inspection device 200 may pass through an intrinsic barrier 802. The intrinsic barrier 802 may be positioned in an area outside the hazardous area being inspected. The intrinsic barrier 802 may limit a voltage and/or amperage available to the electronic devices 204, 410 in the inspection device 200. The intrinsic barrier 802 may also provide short circuit protection to the electronic devices 204, 410. The intrinsic barrier 802 may receive power 804 from a power source 806, such as a wall outlet, power inverter, transformer, battery, power supply, etc. The intrinsic barrier 802 may receive control signals 808 from a control device 810, such as a computer (e.g., server, PC, tablet, laptop, phone, etc.). The intrinsic barrier 802 may also transmit data from the electronic devices 204, 410 in the inspection device 200 to the control device 810. The intrinsic barrier 802 may also be coupled to a ground 812 (e.g., earth-ground, facility ground, etc.).

The intrinsic barrier 802 may provide intrinsically safe power 814 through a cable 816. The intrinsic barrier 802 may also provide an intrinsically safe path to ground 818 through the cable 816. The intrinsic barrier 802 may further provide intrinsically safe communication 820 between the electronic devices 204, 410 in the inspection device 200 and the intrinsic barrier 802 through the cable 816. The cable 816 may include separate wires for each power, signal, and ground for each electronic device 204, 410. In some embodiments, each electronic device 204, 410 may have a separate cable 816. In some embodiments, associated electronic devices 204, 410 may share a cable 816. For example, as shown in FIG. 8, the camera 204 and the associated illuminating device 410 may share a common cable 816. All power, signal, and ground wires for the camera 204 and associated illuminating device 410 may be included in the cable 816. In some embodiments, different types of wires may be included in separate cables 816. For example, all of the power wires for the camera 204 and illuminating device 410 may be included in a first cable 816, all of the signal wired for the camera 204 and the illuminating device 410 may be included in a separate cable 816, and all of the ground wires for the camera 204 and the illuminating device 410 may be included in a separate cable 816.

The intrinsic barrier 802 may individually limit a voltage on each wire in the cable 816 to less than about 15 volts, such as less than about 12 volts. The intrinsic barrier 802 may also limit an amperage on each wire in the cable 816 to less than about 125 milliamps (mA), such as less than about 100 mA. The intrinsic barrier 802 may also be configured to stop power and/or data transmission in the cable 816 if a short circuit is detected. In some embodiments, the intrinsic barrier 802 may individually stop power and/or data transmission on each wire in the cable 816 if a short circuit is detected in the wire. In some embodiments, the intrinsic barrier 802 may further limit total voltage and/or total amperage in the cable 816.

In some embodiments, the inspection device 200 may include multiple cameras 204 and associated illuminating devices 410. The inspection device 200 may include a separate intrinsic barrier 802 and cable 816 for each camera 204 and associated illuminating device 410.

Figure 9:
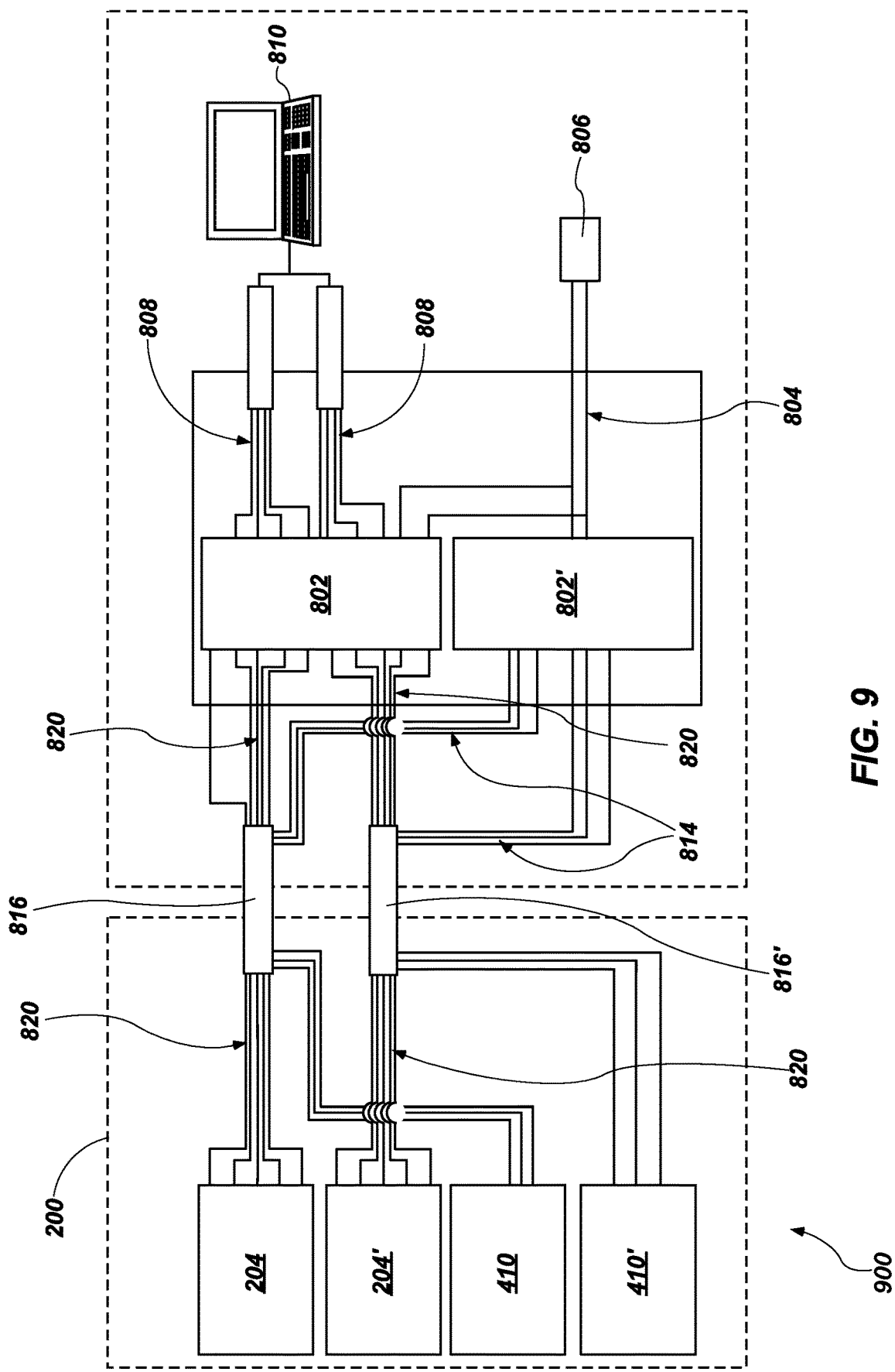
FIG. 9 illustrates a wiring schematic of an inspection system according to an embodiment of the present disclosure.

FIG. 9 is a system wiring diagram 900 for an inspection device 200 having multiple cameras 204, 204' and multiple illuminating devices 410, 410'. In some embodiments, as shown in FIG. 9, the inspection device 200 may have separate intrinsic barriers 802, 802' for power and data transfer. For example, a first intrinsic barrier 802 may receive and transmit data and/or control signals 808 to and from the control device 810. The first intrinsic barrier 802 may provide intrinsically safe communication 820 between the first intrinsic barrier 802 and the cameras 204, 204'. A second intrinsic barrier 802' may provide intrinsically safe power 814 to the electronic devices 204, 410. In some embodiments, the second intrinsic barrier 802' may only provide intrinsically safe power 814 to the illuminating devices 410, 410'. In some embodiments, the second intrinsic barrier 802' may provide intrinsically safe power 814 to both the cameras 204, 204' and the illuminating devices 410, 410'.

The cables 816, 816' may each be coupled to both the first intrinsic barrier 802 and the second intrinsic barrier 802', with the intrinsically safe communication 820 for each cable 816, 816' coming from the first intrinsic barrier 802 and the power for each cable 816, 816' coming from the second intrinsic barrier 802'.

Each intrinsic barrier 802, 802' may receive power 804 from the same power source 806. In some embodiments, the intrinsic barriers 802, 802' may be coupled to separate power sources 806. In some embodiments, the first intrinsic barrier 802 may be coupled to the control device 810 for control signals 808 and the power source 806 for power 804. In some embodiments, the first intrinsic barrier 802 may be coupled to the control device 810 for both control signals 808 and power 804.

Each intrinsic barrier 802, 802' may include multiple intrinsic barrier circuits. Each signal or power wire exiting the intrinsic barrier 802, 802' may have a distinct (e.g., dedicated) intrinsic barrier circuit.

Figure 10:
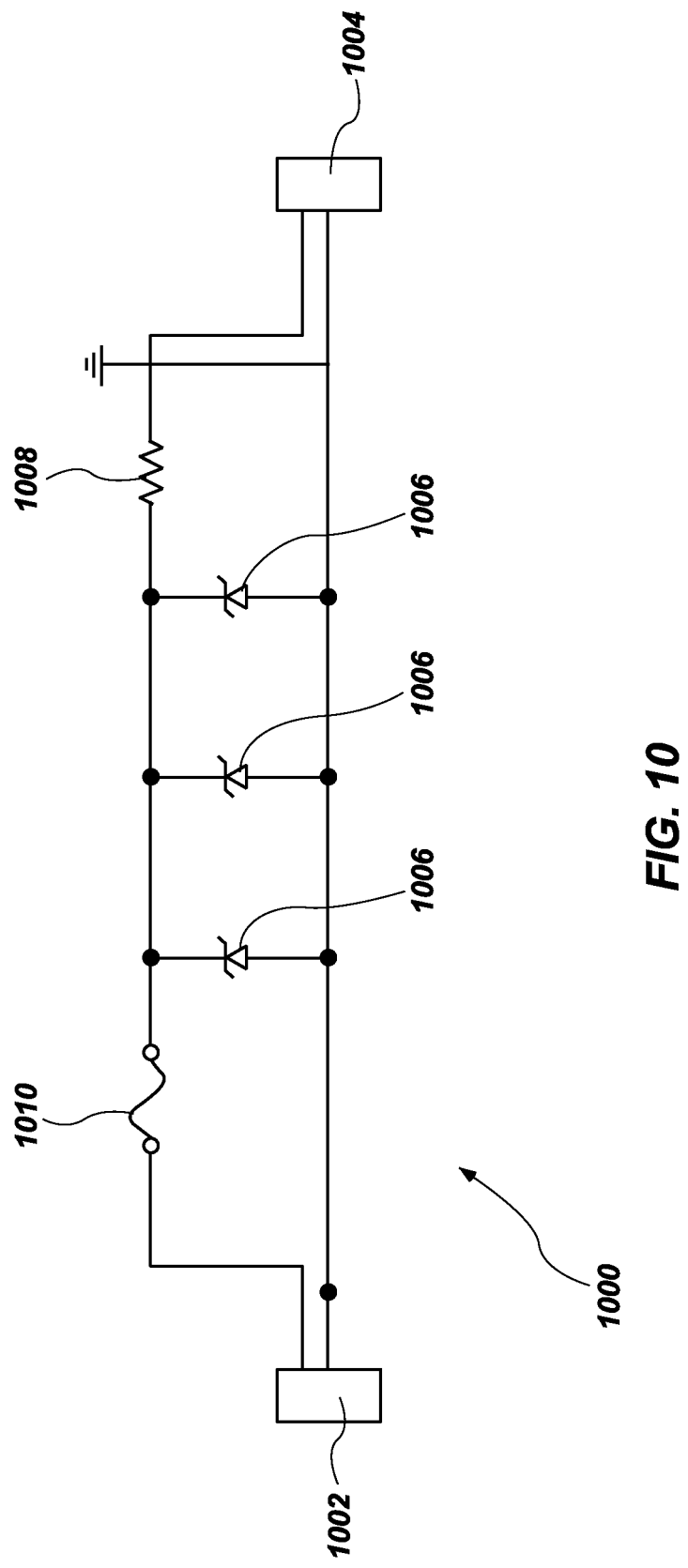
FIG. 10 illustrates a circuit diagram of an intrinsic barrier according to an embodiment of the present disclosure.

FIG. 10 is a wiring diagram of an intrinsic barrier circuit 1000. The intrinsic barrier circuit 1000 may receive an electrical signal or power through an input connection 1002. The intrinsic barrier circuit 1000 may pass substantially the same electrical signal or power through the intrinsic barrier circuit 1000 and out an output connection 1004. The intrinsic barrier circuit 1000 may include multiple components configured to limit the electrical signal or power to an intrinsically safe voltage and/or amperage.

The intrinsic barrier circuit 1000 may limit the voltage through one or more diodes 1006 (e.g., Zener diodes), such as one diode 1006, two diodes 1006, three diodes 1006, or more. The one or more diodes 1006 may be arranged in parallel such that the one or more diodes 1006. The number of diodes 1006 may be determined by the amount of amperage that will be allowed to pass through the intrinsic barrier circuit 1000. For example, the number of diodes 1006 may be selected such that the diodes 1006 arranged in parallel do not limit the amperage below and/or near the amperage limit of the intrinsic barrier circuit 1000. The one or more diodes 1006 may be sized such that a voltage passing through the intrinsic barrier circuit 1000 does not exceed an intrinsically safe voltage, such as less than about 15 volts or less than about 12 volts.

The intrinsic barrier circuit 1000 may limit the amperage through one or more current limiting resistors 1008. The current limiting resistors 1008 may be arranged in series or parallel to achieve a resistance at the limited voltage that results in the desired current limitation. For example, the current limiting resistors 1008 may be sized and/or arranged such that the current passing through the intrinsic barrier circuit 1000 is less than an intrinsically safe current, such as less than about 125 mA or less than about 100 mA.

The intrinsic barrier circuit 1000 may include a safety fuse 1010. The safety fuse 1010 may be sized such that a failure of another portion of the intrinsic barrier circuit 1000 does not result in an amperage or voltage that is not intrinsically safe leaving the intrinsic barrier circuit 1000 through the output connection 1004. For example, the safety fuse 1010 may be sized such that the safety fuse 1010 will stop a current that is over the intrinsically safe amperage from passing through the intrinsic barrier circuit 1000. The safety fuse 1010 may be sized to be larger than the amperage that the current limiting resistors 1008 are sized to allow. For example, the safety fuse 1010 may be sized to allow up to about 50 mA more than the current limiting resistor 1008, such as up to about 25 mA more than the current limiting resistor 1008. The size difference between the safety fuse 1010 and the current allowed by the current limiting resistor 1008 may enable current and voltage fluctuations within the intrinsic barrier circuit 1000 without unnecessarily tripping the safety fuse 1010. However, should the current increase, for example due to a component failure or short circuit, the safety fuse 1010 may trip stopping all current and/or voltage from passing through the intrinsic barrier circuit 1000.

Embodiments of the present disclosure may result in an inspection system for inspecting hazardous areas where the components that are positioned within the hazardous area are smaller in size and more easily maneuverable. Intrinsically safe power may allow for smaller cameras at least due to the elimination of explosion proof housings and internal power. The smaller cameras may enable inspection systems with one or more cameras to be positioned and maneuvered in small confined hazardous areas.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternate useful combinations of the elements described, will become apparent to those skilled in the art from the description. Such modifications and embodiments also fall within the scope of the appended claims and equivalents.

What is claimed is:

1. An inspection apparatus for inspecting a rocket bore comprising:
    a first camera configured to be used in a rocket bore, wherein the first camera is configured to receive camera power and camera control signals from an area outside the rocket bore;
    a second camera configured to be used in the rocket bore, wherein the second camera is configured to receive camera power and camera control signals from the area outside the rocket bore, the second camera positioned on an angled extended portion of the inspection apparatus;
    an illuminating device adjacent at least one of the first camera and the second camera, the illuminating device configured to receive illumination power and illumination control signals from the area outside the rocket bore; and an intrinsic barrier configured to receive the camera power, the camera control signals, the illumination power, and the illumination control signals in the area outside the rocket bore and pass the camera power, the camera control signals, the illumination power, and the illumination control signals to the first camera, the second camera, and the illuminating device into the rocket bore in an intrinsically safe manner.

2. The inspection apparatus of claim 1, further comprising a computer configured to generate the camera control signals.

3. The inspection apparatus of claim 2, wherein the computer is configured to generate the illumination control signals.

4. The inspection apparatus of claim 1, wherein the illumination device comprises one or more LED lights.

5. The inspection apparatus of claim 1, wherein the intrinsic barrier comprises circuitry configured to limit an intrinsic amperage to less than 100 milliamps.

6. The inspection apparatus of claim 1, wherein the intrinsic barrier comprises circuitry configured to limit an intrinsic voltage to less than 12 volts.

7. The inspection apparatus of claim 1, further comprising a mount configured to secure the first camera and the second camera inside the rocket bore.

8. The inspection apparatus of claim 7, wherein the mount comprises an indexing feature configured to change an orientation of the first camera and the second camera inside the rocket bore.

9. The inspection apparatus of claim 8, wherein the indexing feature comprises a handle positioned outside the rocket bore configured to enable operation of the indexing feature without removing the mount.

10. An inspection system for explosive environments comprising:

an inspection head comprising a camera and an illumination device, the inspection head configured to be secured within an explosive environment; and a first intrinsic barrier configured to receive electrical signals for the inspection head and a second intrinsic barrier configured to receive power for the inspection head in an area outside the explosive environment, the first intrinsic barrier further configured to transmit intrinsically safe electrical signals to the inspection head and the second intrinsic barrier further configured to transmit intrinsically safe power to the inspection head.

11. The inspection system of claim 10, wherein the illumination device comprises at least one array of LED lights.

12. The inspection system of claim 10, further comprising at least one cable extending between at least one of the first intrinsic barrier or the second intrinsic barrier and the inspection head, wherein the at least one cable comprises one or more distinct conductors configured to transmit at least one of the intrinsically safe power and the intrinsically safe electrical signals between the at least one of the first intrinsic barrier or the second intrinsic barrier and the inspection head.

13. The inspection system of claim 10, wherein the camera comprises a memory configured to store images captured by the camera.

14. The inspection system of claim 10, wherein the camera is configured to transmit image data through at least one of the first intrinsic barrier or the second intrinsic barrier to a computing device located outside the explosive environment.

15. The inspection system of claim 10, wherein the inspection head only receives power and electrical signals from at least one of the first intrinsic barrier or the second intrinsic barrier.

16. A method of performing inspections in hazardous environments comprising:

mounting an inspection head inside a hazardous environment, the inspection head comprising a first externally powered camera, a second externally powered camera, and an illumination device, the second externally powered camera positioned on an angled extended portion of the inspection head;

transmitting power to the inspection head through an intrinsic barrier;

transmitting electrical control signals to the inspection head through the intrinsic barrier; and receiving imaging data from the inspection head.

17. The method of claim 16, wherein mounting the inspection head comprises securing the inspection head to a mounting plate extending through a wall separating the hazardous environment from a non-hazardous environment.

18. The method of claim 17, wherein the inspection head is configured to rotate relative to the mounting plate.

19. The method of claim 18, further comprising rotating the inspection head to a desired orientation and locking the rotation of the inspection head in the desired orientation.

20. The method of claim 16, wherein transmitting the power to the inspection head through the intrinsic barrier comprises limiting the power at the intrinsic barrier to less than 100 milliamps and less than 12 volts.

* * * * *